United States Patent [19]
Stewart

[11] Patent Number: 5,523,671
[45] Date of Patent: Jun. 4, 1996

[54] CHARGING SYSTEM FOR BATTERY POWERED DEVICES

[75] Inventor: Gregory N. Stewart, Austin, Tex.

[73] Assignee: Dell USA, L.P., Austin, Tex.

[21] Appl. No.: 97,339

[22] Filed: Jul. 23, 1993

Related U.S. Application Data

[63] Continuation of Ser. No. 656,265, Feb. 14, 1991, abandoned.

[51] Int. Cl.$^6$ ......................................................... H02P 11/00
[52] U.S. Cl. .................................. 320/39; 320/21; 320/31
[58] Field of Search ......................................... 320/21, 39

[56] References Cited

U.S. PATENT DOCUMENTS

| | | | |
|---|---|---|---|
| 4,639,655 | 1/1987 | Westhaver et al. | 320/14 |
| 4,829,259 | 5/1989 | Konopka | 320/21 |
| 5,198,743 | 3/1993 | McClure et al. | 320/21 X |
| 5,363,031 | 11/1994 | Miller et al. | 320/21 |

Primary Examiner—Steven L. Stephan
Assistant Examiner—Nicholas Ponomarenko
Attorney, Agent, or Firm—Henry N. Garrana; Mark P. Kahler; Michelle M. Turner

[57] ABSTRACT

A system for controlling the rate and duration of battery charging. A microprocessor is connected in a battery current signal feedback loop and used to control the battery charge cycle. The rate of charge is gradually stepped up at the beginning of the charge cycle until the charging current reaches a defined maximum value, and thereafter maintained between the maximum and a defined minimum value for the duration of the charge cycle. The microcontroller terminates the charge cycle when the battery charging current begins to increase while the rate of charge remains constant, this being an indication that the battery is fully charged. Sensors input signals to the microcontroller to prevent or terminate charging if the battery cells are not within an appropriate temperature range, or if a short circuit or other adverse condition arises.

25 Claims, 3 Drawing Sheets

CHARGING SYSTEM FOR BATTERY POWERED DEVICES

CROSS REFERENCE TO RELATED APPLICATION

This application is a continuation of application Ser. No. 07/656,265, filed Feb. 14, 1991, now abandoned, for Rechargeable System with Separate Battery Circuits in a Common Module.

TECHNICAL FIELD

The invention relates generally to battery powered electrical and electronic systems and specifically to a battery charging system incorporating a microprocessor within a feedback loop for controlling the rate and duration of charging.

BACKGROUND OF THE INVENTION

An increasing number of electrical and electronic systems are being designed to be powered by batteries. Prime examples of such systems include portable computers such as laptops and notebooks. Portable computers are rapidly developing the capability to include most of the peripheral devices and high speed circuitry previously implemented only on conventional desktop personal computers. As the number of peripheral devices supported by portable computers increases, so does the amount of power consumed by the computer. As a result, it has become increasingly difficult to provide users with the maximum functionality and still maintain a reasonable battery life.

Many portable laptop computers and similar systems incorporate rechargeable batteries, typically of Nickel Cadmium (NiCd) or Nickel Metal Hydride (NiMH) construction. Such batteries are preferred because of their high capacity and longevity after repeated recharges. The batteries are recharged using a battery charging circuit connected to a power source. The charging circuit must be capable of charging the batteries in a minimum amount of time for user convenience. Importantly, the charging circuit must also be designed to minimize deterioration of the batteries that can result should the batteries overcharge, overheat or experience a short circuit. Improper application of power by the charging circuit can, in addition to reducing battery longevity, result in permanent cell damage and possibly leakage of electrolyte to surrounding components.

Conventional battery charging circuits rely upon power controller integrated circuits to regulate the current flow in performing charging operations. Current is typically regulated using a simple pulse width modulator (PWM) regulator. A comparator monitors the battery voltage and terminates the charging cycle when the voltage reaches a threshold or begins to fall significantly, this condition being known to indicate the battery is fully charged. While widely used, a variety of problems are associated with charging circuits of this type. For example, the abrupt application of charging current to the battery at the beginning of the charging cycle can result in sharp fluctuations in voltage as the battery chemistry adapts to the current input, resulting in possible damage or failure to achieve a full charge. This is likely to occur with batteries that have been in long term storage. Overcharging can also occur with conventional charging circuits. For certain batteries, the charging cycle must be terminated with the detection of a relatively small voltage decrease to avoid overcharging, yet circuit noise can easily exceed the triggering voltage of the comparator.

Further, conventional chargers typically are not equipped to terminate the charging cycle or prevent charging when deleterious conditions, such as a battery short circuit, freezing, excessive temperatures or the like, are present.

What is needed is an improved battery charging circuit that controls the rate and duration of battery charging to provide an effective yet safe charge. Specifically, a desirable arrangement would include logic for gradually stepping up the rate of charge at the beginning of the charge cycle and for terminating the charge cycle when the battery is determined to be fully charged or in the event that adverse conditions occur during charging.

SUMMARY OF THE INVENTION

The foregoing problems are solved and a technical advance is achieved by apparatus and method for controlling the rate and duration of battery charging. In a departure from the art, a battery charging system includes a microprocessor in a battery current signal feedback loop for controlling the battery charge cycle. The rate of charge is gradually stepped up at the beginning of the charge cycle until the charging current reaches a defined maximum value and is thereafter maintained between the maximum and a defined minimum value for the duration of the charge cycle. The microcontroller terminates the charge cycle when the battery charging current begins to increase while the rate of charge remains constant, this being an indication that the battery is fully charged. Sensors input signals to the microcontroller to prevent or terminate charging if the battery cells are not within an appropriate temperature range, or if a short circuit or other adverse condition arises.

In an illustrative embodiment, the charging system of the invention has particularly useful application for recharging batteries in an electronic device such as a portable computer or other portable appliance. The system is connectable to a power source of sufficient terminal voltage for charging a battery. A switching circuit controls the application of charge to the battery, and includes a series combination of a resistor, an inductor and a field-effect transistor (FET) switching element. An amplifier amplifies the voltage across the resistor due to the charging current. A microcontroller having a multiplexed analog-to-digital (A/D) converter receives the amplified voltage as a feedback signal, and also receives voltages from sensors representing battery temperature and terminal voltage. The microcontroller provides digital output signals in the form of pulses of variable duty ratio for driving the switching element and controlling the charging current. A driver circuit receives the pulses from the microcontroller and drives the switching element so as to control the charging current of the battery. The microcontroller is programmed to monitor and regulate the charging current by varying the duty ratio of the pulses applied to the driver circuit and to tern-finale charging when the charging current begins to increase or the battery terminal voltage begins to fall significantly, these conditions having been found to indicate that the battery is fully charged. In addition, the microcontroller is programmed to prevent the initiation of charging when the battery temperature is too high or too low, and to terminate charging if its temperature rises excessively or any of its cells are short-circuited.

In one preferred embodiment, the apparatus comprises a switch circuit for regulating the charging current of a battery responsive to a variable control signal, the switch circuit connected in series between the battery and a power source. A current determining circuit comprising logic for varying the control signal responsive to the current proportional signal is connected to the switch circuit for determining the battery charging current and generating a signal proportional thereto. A control circuit is connected to the switch circuit and to the current determining circuit for applying the control signal to the switch circuit to cause the switch circuit to progressively increase the charging current until the charging current reaches a defined maximum value and thereafter maintain the charging current between the maximum value and a defined minimum value until the battery is fully charged. In another aspect, the control circuit logic terminates the battery charging when the current proportional signal begins to increase while the control signal is constant, as an indication that the battery has reached a fully charged condition.

A technical advantage achieved with the invention is that it avoids abrupt application of charging current to a battery by instead gradually increasing the charging current, thereby obviating sharp fluctuations in battery voltage that can cause battery damage or incomplete charging.

A further technical advantage achieved is a more accurate termination of battery charging based upon the feedback signal to the microcontroller indicating an increasing charging current. This is a more reliable indicator of a fully charged battery than detection of terminal voltage drop, since circuit noise in conventional chargers can easily exceed the optimal triggering voltage.

A further technical advantage achieved is the provision of a versatile, low cost circuit that can be easily programmed to incorporate the latest research in the behavior of batteries to achieve maximum charging while at the same time extending their useful life.

A further technical advantage achieved is that the circuit is readily adaptable to control charging of multiple battery banks being alternately employed by a common load.

DESCRIPTION OF THE PREFERRED EMBODIMENT

Figure 1:
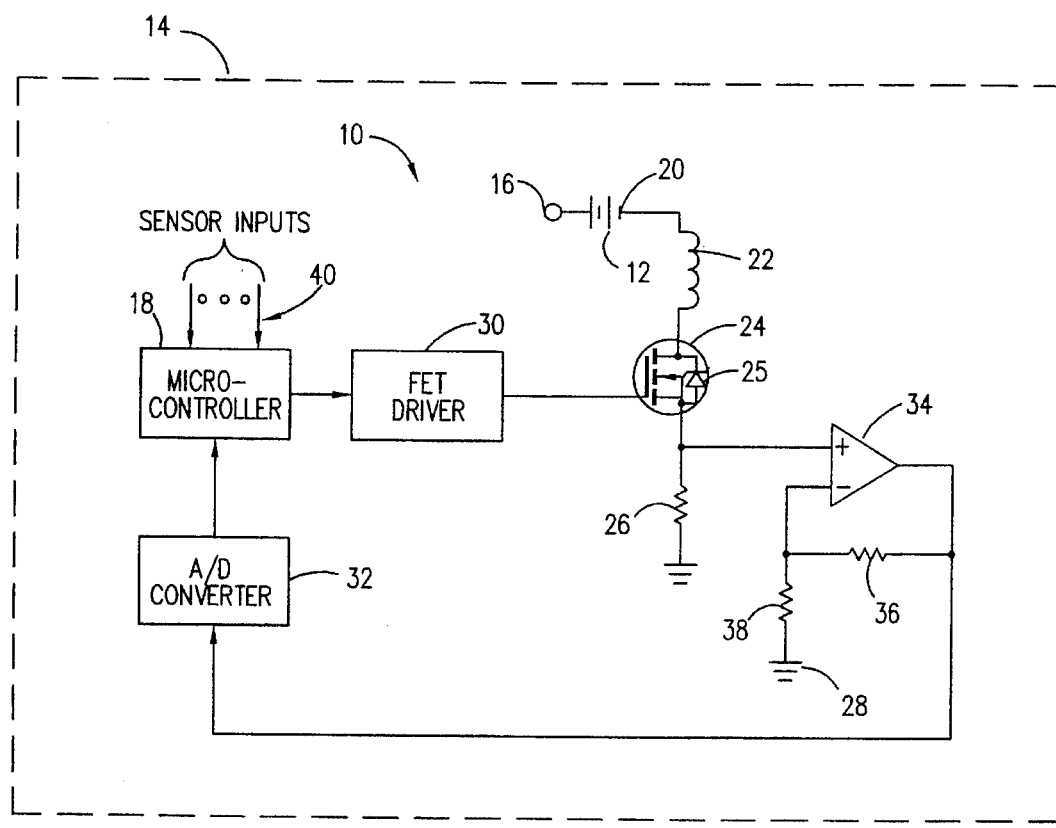
FIG. 1 is a schematic block diagram of a current control circuit for a battery charging system embodying principles of the present invention.

In FIG. 1, the reference numeral 10 designates a current control circuit for a battery charging system embodying features of the present invention. A battery 12 of the circuit 10 is connected in a conventional manner (not shown) to a load 14, which may consist of any electrical or electronic device or circuit designed to run on batteries, for example, a personal computer. While not shown, it is understood that a positive terminal 16 of the battery 12 is connected to a voltage source of suitable power output capability for charging the battery. As described below, the circuit 10 regulates the rate and duration of charging of the battery 12 under control of a microcontroller 18.

A negative terminal 20 of the battery 12 is connected through an inductor 22 to the drain of a field-effect transistor (FET) 24, typically a power MOSFET. The FET 24 also includes a protective zener diode 25. The FET 24 acts as a switch, the source thereof being connected through a resistor 26 to a ground terminal 28, to which the ground of the voltage source (not shown) is also returned. The gate of the FET 24 is driven by an FET driver circuit 30 which receives width-modulated pulses from the microcontroller 18.

In one preferred embodiment, the microcontroller 18 is commercially available from National Semiconductor as part number COP888CF. The architecture and design of the microcontroller 18 will depend on the particular requirements of the charging system. While not shown, it is understood that a microprocessor, logic devices, memory and other components are included in the microcontroller 18, as necessary. It is understood that the operation of the microcontroller 18 may be implemented by microcode instructions (firmware) stored in the microcontroller. A copy of the sample source code utilized in a preferred embodiment is attached as Appendix A. The means of construction and programming of the microcontroller 18 will be apparent to one skilled in the art from the disclosure herein and the general state of the art.

An analog to digital (A/D) converter 32 is connected to the microcontroller 18 for converting an analog voltage signal representative of the charging current into digital form. An operational amplifier (OP-AMP) 34 receives an input voltage from the junction of the resistor 26 and the source terminal of the FET 24 at its noninverting input. The gain of the OP-AMP 34 is determined by a feedback resistor 36 and an input resistor 38, which are connected from the inverting input of the OP-AMP 34 to its output and to ground, respectively. The output of the OP-AMP 34 is connected to the input of the A/D converter 32.

Digital signal inputs 40 are provided to the microcontroller 18 for monitoring various conditions of the system. For example, the inputs 40 may be utilized to monitor the temperature and voltage of the battery 12. The inputs 40 may also define parameters of the charging system, including the number of batteries, nominal voltage per cell, minimum and maximum charging limits, duration of charge and a fail-sate condition from a "watchdog timer" built into the logic of the microcontroller 18.

In operation, the circuit 10 is utilized to charge the battery 12 as follows. The charging process is commenced if the temperature of the battery 12 is within an appropriate temperature range, as determined by signals to the microcontroller 18 from the inputs 40. For example, a preferred temperature range may be between 0° C. and 40° C., where charging is terminated if battery temperature later rises above 60° C. The microcontroller 18 initially generates a train of pulses of low duty ratio to the FET driver circuit 30. These pulses, at a high frequency of typically 8.3 kHz, turn on the FET 24, causing a current to flow through the inductor 22 and the resistor 26. When the FET 24 is turned off, the internal protective zener diode 25 conducts, and the current flowing through the inductor 22 is allowed to fall, as the polarity of voltage across it is now reversed. This current still flows through the resistor 26. The net result is that the average current builds up slowly to a value controlled by the duty ratio of the pulses, the inductance of the inductor 22 and the average voltage difference between the charging voltage source (not shown) and the battery 12 voltage.

The resistor 26 is a low value resistor used for measuring the charging current. The charging current develops a small voltage drop across the resistor 26, which is amplified by the OP-AMP 34 and passed to the A/D converter 32. Current readings are made periodically (such as every 5.12 ms), and converted to equivalent digital values. The microcontroller 18 averages the current readings over a specified period of time (such as every 8 seconds), comparing their average value with a preprogrammed value corresponding to a desired charging current of typically 800 mA, for example. The microcontroller 18 slowly increases the duty ratio of the output pulses to the FET driver 30 until the charging current reaches the desired value. At this point, the battery 12 voltage and temperature may be checked to determine whether charging should continue. If the temperature is too low or too high, or if one or more cells of the battery 12 are short-circuited internally, charging is terminated and appropriate indications may be provided to a user.

Figure 2:
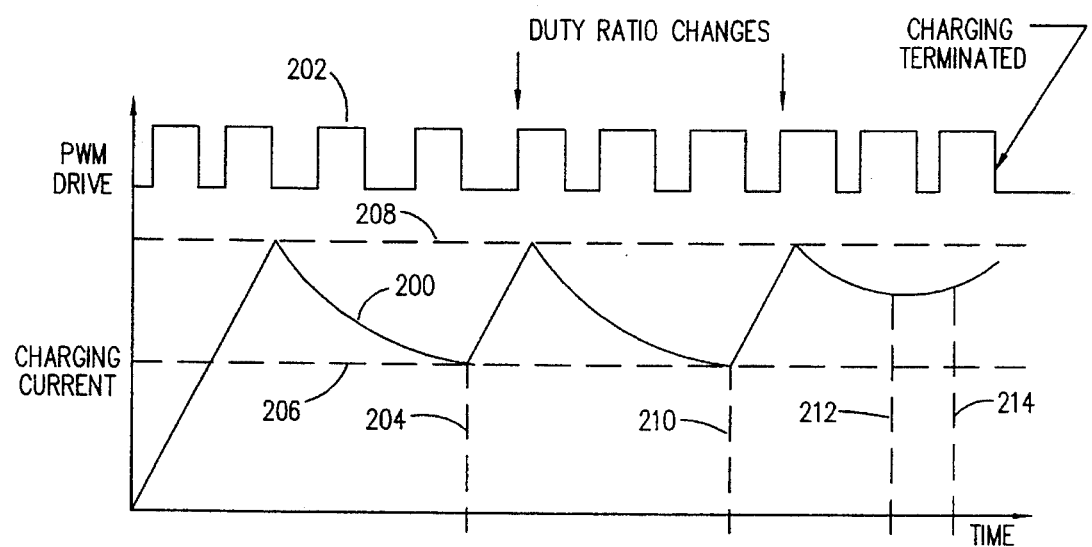
FIG. 2 is a graphical illustration of battery charging current as a function of time and a pulse width modulated drive signal as a function of time, for the circuit of FIG. 1.

FIG. 2 illustrates the charging current 200 as a function of time for the circuit 10. FIG. 2 also illustrates (in an exaggerated form) the variation of the duty ratio of the pulses 202 as a function of time, generated by the microcontroller 18. As the battery 12 is charged, the battery voltage begins to rise, and the current 200 therefore begins to fall, more or less exponentially. The averaged current value is monitored once per minute. At a time 204, the microcontroller 18 senses that the current 200 has fallen below a preset lower limit 206 (typically 750 mA), and increases the duty ratio of the pulses 202. This causes the charging current 200 to increase steeply until it reaches a preset upper limit 208 (typically 850 mA), whereupon the duty ratio of the pulses 202 ceases to increase. The gradual reduction of charging current 200 continues as the battery 12 is charged and its terminal voltage rises. A similar effect occurs at a later time 210, again resulting in the increase of the duty ratio of the pulses 202. This mode of operation continues until the battery 12 is fully charged, thus charging the battery at a the maximum allowable rate.

Eventually, the charging current 200 decreases somewhat and then begins to increase, as shown at a time 212. This is due to a fall in the battery 12 voltage which occurs when the battery is fully charged. When the charging current 200 begins to increase, at some time 214, the microcontroller 18 senses this increase and immediately reduces the duty ratio of the pulses 202 to zero, discontinuing the charging process, as the battery 12 is now fully charged. An increase of about 1% or 8 mA typically is used to determine the shut-off point. Research has shown that the detection of this current charge is more reliable and faster than the detection of changes in the terminal voltage of the battery 12, which conventional types of battery charger circuits typically use to determine the end of charging.

In another preferred embodiment, several other conditions are monitored by the microcontroller 18 from the signal inputs 40. As previously mentioned, the temperature of the battery 12 is monitored to ensure that charging is initiated only if the temperature is within acceptable limits. Also, the voltage of the battery 12 is monitored, initially to prevent charging if one or more cells of the battery 12 are short-circuited, and also to determine if the voltage has begun to fall by more than about 40 mV during the charging process, in which case charging is also terminated, as this indicates that the battery is fully charged. The inputs 40 further are utilized to set up other parameters, previously discussed.

Figure 3:
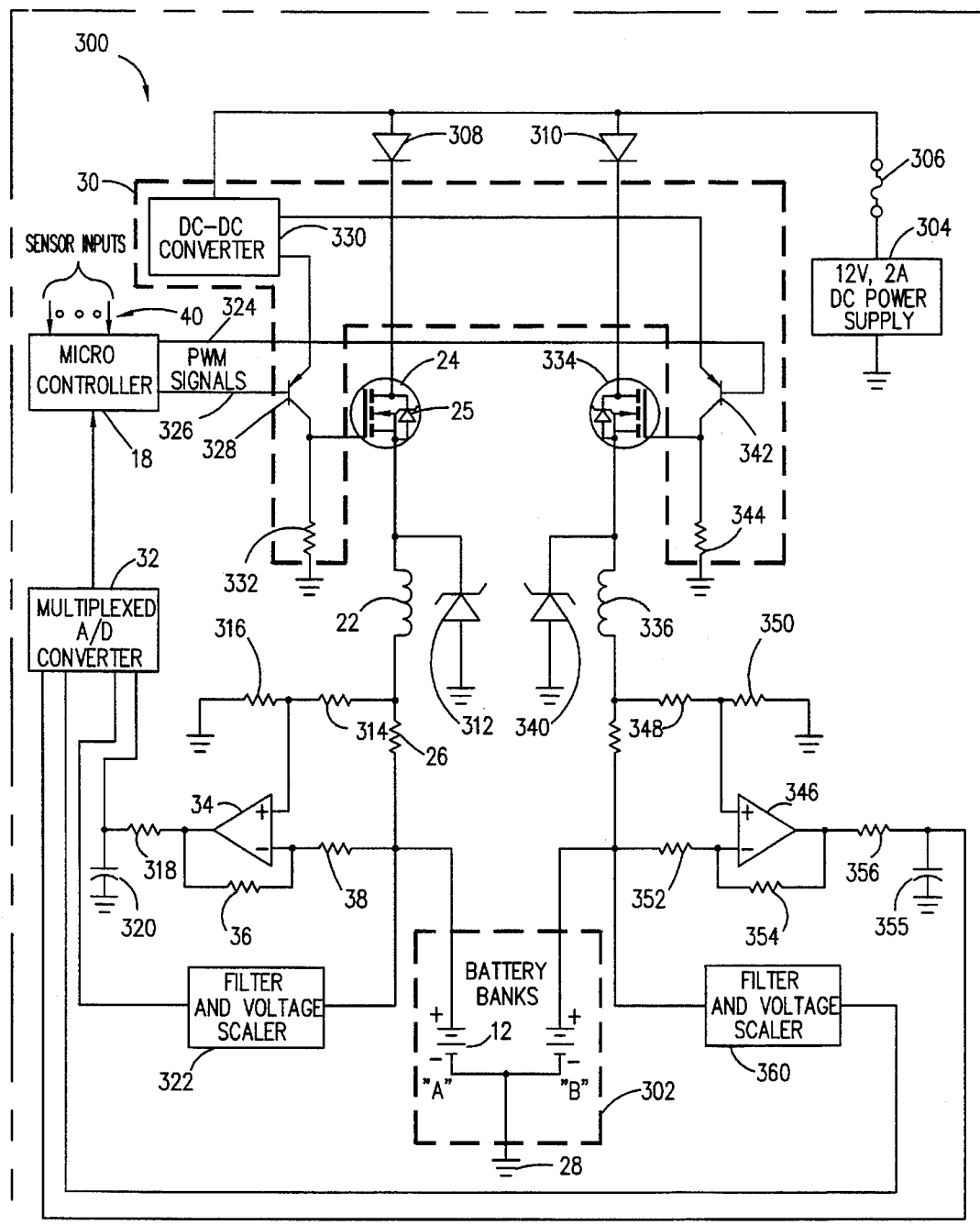
FIG. 3 is a schematic block diagram of a dual battery charging system incorporating the current control circuit of FIG. 1.

FIG. 3 is a schematic block diagram illustrating a battery charging system 300 incorporating features of the present invention. Elements of the system 300 substantially similar to elements of the circuit 10 of FIG. 1 are identified with the same reference numerals as in FIG. 1 for convenience.

The system 300 is configured for charging two separate battery banks "A" (the battery 12 of FIG. 1) and "B" in a battery pack 302. It is understood that the battery banks A and B each comprise one or more battery cells connected in series. For computer applications, the cells are often packaged in a self-contained, removable pack which comprises each of the banks A and B. In one embodiment, for example, each bank A and B includes a chain of seven (7) size "⅔ A" Nickel-Cadmium (NiCd) cells.

A +12V, 2A voltage source 304 is connected through a fuse 306 to two diodes 308 and 310 which serve to isolate two charging circuits. The first charging circuit comprises the FET 24, the inductor 22 and the resistor 26 in series, and is connected between the cathode of the diode 308 and the positive terminal of the battery 12, whose negative terminal is grounded at 28. Although the sequence of these components is different from the corresponding components of FIG. 1, this does not alter the properties of the charging circuit significantly. Instead of using the internal zener diode 25 associated with the FET 24, an external zener diode 312 provides the alternate current path when the FET 24 is turned off.

Because both terminals of the resistor 26 are floating, the OP-AMP 34 is configured as a differential amplifier circuit, by the addition of resistors 314 and 316, connected from the noninverting input of the OP-AMP 34 to ground 28 and to the more positive terminal of the resistor 26, respectively. The resistor 38 is connected to the less positive terminal of the resistor 26 as before, but is no longer grounded. A resistor 318 connected to the output of the OP-AMP 34, and a capacitor 320 connected from the other terminal of resistor 318 to ground, form a low-pass filter for smoothing the output voltage of the amplifier 34 and removing ripple.

The A/D converter 32 is a multiplexed type, having several inputs, four of which are shown. Other inputs (not shown) may be used for monitoring battery temperature or other parameters. Otherwise, digital signal inputs 40 are connected directly to the microcontroller 18. The filtered voltage on the capacitor 320 represents the charging current of the battery bank A, and is applied to one input of the A/D converter 32.

The positive terminal of the battery bank A is applied to a voltage scaler and filter circuit 322 which provides a scaled and smoothed voltage to another input of the A/D converter 32. Thus the microcontroller 18 can determine both the charging current and the terminal voltage of the battery bank A.

The microcontroller 18 has two pulse width modulated (PWM) signal outputs on lines 324 and 326, respectively. The signal output on the line 326 is used to drive the base of a transistor 328 forming part of the FET driver circuit 30. The transistor 328 receives a voltage of typically +22V from a d.c. to d.c. converter 330 connected to its emitter. The collector of the transistor 328 is connected to a resistor 332 that is also connected between the gate of the FET 24 and ground. This transistor 328 thus drives the FET 24 on for the duration of each pulse received from the microcontroller 18.

A second charging circuit of identical construction is used to charge the battery bank B. The second charging circuit includes a FET 334, an inductor 336, and a resistor 338 connected in series between the cathode of the diode 310 and the positive terminal of the battery bank B. A zener diode 340 provides an alternate path for the current flow from the inductor 336 when the transistor 334 is turned off. A PNP transistor 342 and its load resistor 344 are also included in the FET driver circuit 30 and are driven by a second PWM signal output on the line 324 from the microcontroller 18. An OP-AMP 346, with resistors 348, 350, 352, 354 and 356 and a capacitor 358, provide the differentially amplified and smoothed signal representing the charging current of the battery bank B to the A/D converter 32. A second filter and voltage scaler circuit 360 provides an indication of the battery bank B voltage to the A/D converter 32.

In operation, the battery charging system 300 charges the battery banks A and B with the rate and duration of charging for each being controlled by the microprocessor 18. The first and second charging circuits of the system 300 function in a manner substantially similar to the circuit 10 of FIG. 1, previously described. The charging current for each bank A and B is gradually ramped up and then held between upper and lower limits, by gradually increasing the duty ratio of the pulses applied to each battery charging circuit as the charging current drops. Each charging circuit of the system 300 is turned off independently when the charging current for the associated battery bank A or B begins to rise.

An additional function of the system 300 is provided by the filter and voltage scalers 322, 360. The microcontroller 18 senses whether the bank A or B cell voltage is within a normal range and prevents or terminates charging if one or more of the cells is shorted out due to an internal malfunction. Charging is also terminated for either bank A or bank B if the voltage for the bank begins to fall by more than 40 mV during charging, as this indicates a fully charged condition in the battery.

Several advantages accrue from placing the microcontroller 18 in the feedback loop of a pulse width modulated charging circuit. The microcontroller 18 can directly monitor the charging current and control it so that it lies between preset limits during charging. This provides advantages over conventional chargers in which the current is regulated by a simple PWM regulator with a comparator being used to monitor the battery voltage and terminate the charging cycle when it begins to fall. Such chargers do not readily terminate charging due to a small differential voltage, because circuit noise can easily exceed the triggering voltage of the comparator. Also, the microcontroller 18 can be provided with inputs 40 representing the battery voltage and temperature, and can terminate or prevent charging when deleterious conditions are present. Further, one microcontroller 18 can control two or more charging circuits independently. In addition, monitoring the charging current with the microcontroller 18 facilitates the detection of the end of the charge cycle. The onset of an increasing charging current is more readily detected than the point when battery voltage begins to decrease.

It is understood that the microcontroller 18 may also be used to alternately connect the banks A and B to the load during discharge of the battery pack 302 approximately every four minutes, thereby allowing the maximum charge to be drawn from the battery pack. This mode of operation is described fully in a copending application assigned to the present assignee.

Also for the system 300, one preferred embodiment of the microprocessor 18 is that available from National Semiconductor Corp. as part number COP888CF. This is a convenient type of microprocessor because it has an 8-input multiplexed A/D converter and two pulse width modulator timer outputs whose high and low transition times can be set independently, thereby allowing for control of period and duty cycle of two separate output pulse channels.

In addition to the possible use of thermometric devices (not shown) to monitor battery bank A and B temperatures, and other devices to monitor the measurements of battery voltage and charging current, the microcontroller 18 can also be used to test itself. Testing is accomplished by the microcontroller 18 generating an output pulse every few seconds while its logic is being performed. If some event causes the logic to be corrupted, the output pulses from the microcontroller 18 cease, and a "watchdog" timer circuit (not shown) can be triggered by the absence of these pulses. The circuit would shut off the gates of the FET's 24 and 334, thereby terminating the charging process. This ensures that the charging process is actually operating correctly, and prevents a malfunction from causing damage to either of the battery banks A or B.

Figure 4:
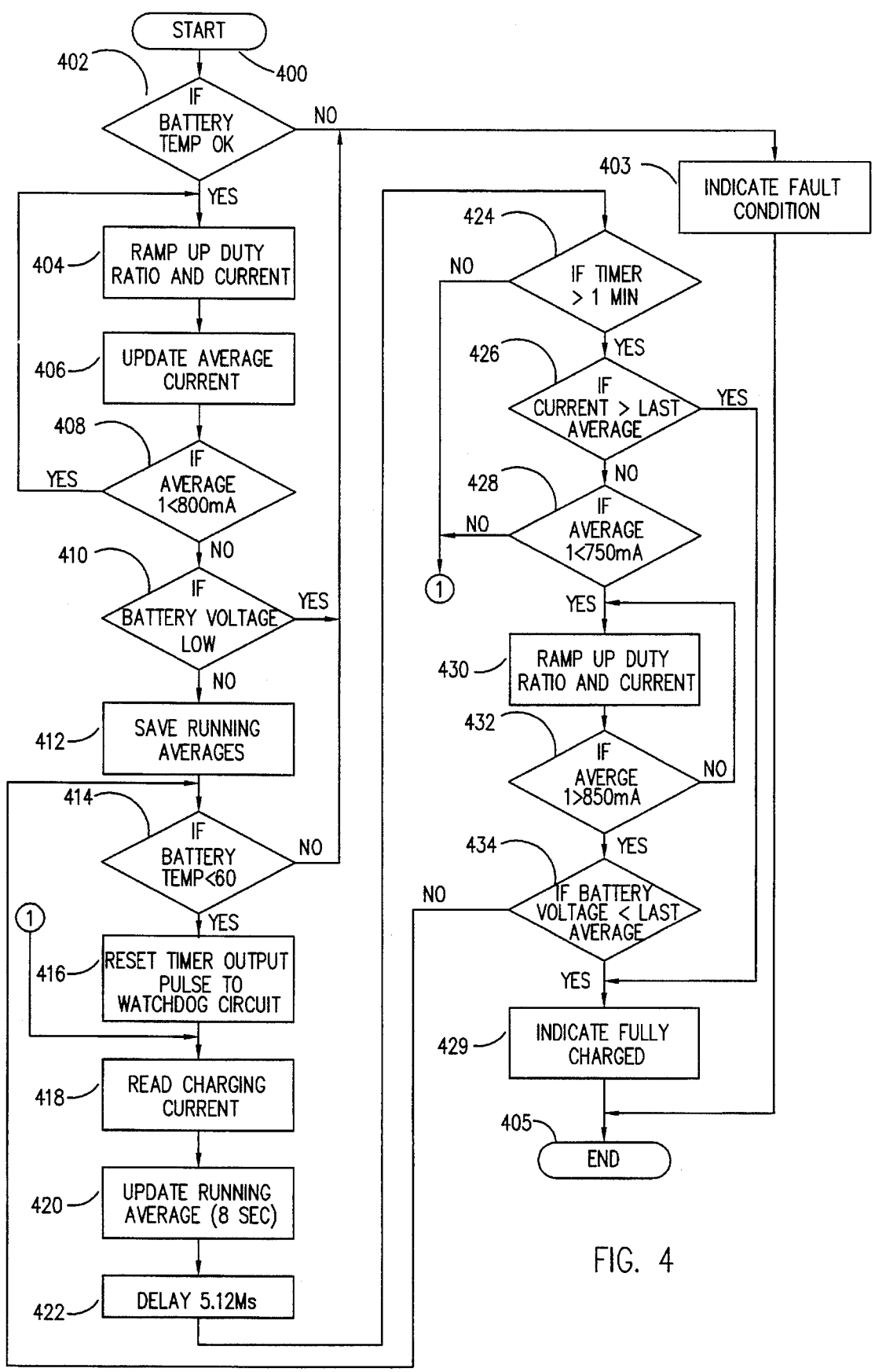
FIG. 4 is a flowchart illustrating current regulation logic implemented in a microcontroller of FIG. 1 or FIG. 3.

FIG. 4 is a flowchart illustrating control logic for operating the circuit 10 and the system 300 in accordance with the present invention. The control logic may be implemented by microcode instructions contained within the microcontroller 18. The control logic is simplified here to describe clearly the manner in which the charging cycle is initiated, the charging current averaged and monitored, the duty ratio altered, and the charging cycle terminated when the current begins rising or the battery voltage begins to fall. It is understood that the logic may be implemented for one or more batteries or banks of batteries to be charged.

Execution begins in step 400. In step 402 the microcontroller 18 determines whether the battery temperature is within an acceptable range (for example, between 0° C. and 40° C.). If not, in step 403 a fault condition is indicated and the charging logic is terminated in step 405. If the battery temperature is within an acceptable range in step 402, execution proceeds to step 404 where the pulse width signal to the driver circuit 30 is initially set to a low value. In step 406 the charging current is monitored, and a running average (over 8 seconds, for example) is stored and updated. In step 408 a determination is made whether the average current is less than a predetermined value of 800 mA. If so, execution returns to step 404 where the duty ratio is increased. This loop is repeated until the average charging current reaches the predetermined value of 800 mA in step 408.

Once it is determined in step 408 that the average charging current is not less than 800 mA, execution proceeds to step 410 where a determination is made whether the battery voltage is low. If it is abnormally low, indicating that some of the battery cells may be shorted, execution proceeds to step 403 to indicate a fault condition and the logic terminates charging in step 405. If the battery voltage in step 410 is not low, then in step 412 the running averages of charging current and battery voltage are stored. Although not shown in FIG. 4, both current and battery voltage readings may be averaged, as may the temperature readings, to reduce noise and other errors.

In step 414, a determination is made whether the battery temperature is less than a predetermined value (60°). If not, execution proceeds to step 403 to indicate a fault condition and logic terminates charging in step 305. Otherwise, a pulse is generated in step 416 and sent to a "watchdog timer" such as a retriggerable monostable circuit, not shown in FIG. 3 but mentioned above. An internal timer is also reset at this point.

In step 418 the charging current is read. In step 420 the read value is used to update the running average. In step 422, a current sampling delay of about 5.12 ms occurs. In step 424 a determination is made whether a one minute timer has expired, and if not, execution returns to step 418. If the timer has expired in step 424, execution proceeds to step 426. In step 426, the running average current is compared with the saved value, replacing the saved value, to determine whether the current has increased or decreased. Normally, the average current value will decrease gradually. If in step 426 the current value is not greater than the last average current value, indicating a decrease, execution proceeds to step 428. In step 428 a determination is made whether the average current value is less than 750 mA. If not, execution returns to step 418 and the process is repeated. If in step 426 the current is greater that the last average current value, meaning the current has increased, execution proceeds to step 429 where a fully charged condition is indicated. The charging cycle is then terminated in step 405.

If in step 428 the average current is less than 750 mA, execution proceeds to step 430. In step 430, the duty ratio is increased to ramp up the charging current. In step 432, a determination is made whether the average charging current has exceeded an upper limit of 850 mA. If not, execution returns to step 430.

If in step 432 the upper limit of 850 mA is exceeded, execution proceeds to step 434 where the battery voltage is tested against the previous running average to determine if it is rising or falling. A determination is made whether the battery voltage is less than the last average voltage by more than 40 mV, for example. If not, the voltage is not falling, and execution returns to step 414. Otherwise, the voltage is falling and execution proceeds to step 429 where a full charge is indicated. The charge cycle is then terminated in step 405.

It is understood that the present invention can take many forms and embodiments. The embodiments shown herein are intended to illustrate rather than to limit the invention, it being appreciated that variations may be made without departing from the spirit of the scope of the invention. For example, the charging circuit may be implemented using different charge current and voltage parameters, as well as different temperature input parameters. The exact sequence and rate of the system tests may be varied, as may the frequency of current measurements and the averaging time. Further, it will be appreciated that different elements may be embodied as a single integrated chip, or any varying combination of discrete digital or analog components interconnected in a standard manner. Also, any number or type of battery banks may be connected in parallel for furnishing power to the load. The load may comprise any device or devices requiring power. Examples include, inter alia, computers, circuits, lighting devices and consumer electronic products such as camcorders, players and portable telephones.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. Apparatus for controlled battery charging in which a battery is connectable to a power source capable of providing charging current at a suitable terminal voltage, the apparatus comprising:

a switch circuit for regulating the charging current of said battery responsive to a variable control signal, said switch circuit connected in series between said battery and said power source;

a circuit connected to said switch circuit for determining said battery charging current and generating a signal proportional thereto;

a control circuit connected to said switch circuit and to said current determining circuit for applying said control signal to said switch circuit, said control circuit comprising logic for:

i). varying said control signal responsive to said current proportional signal, to cause said switch circuit to progressively increase said charging current until said charging current reaches a defined maximum value, ii). maintaining said control signal until said charging current reaches a defined minimum value, and iii). varying said control signal to cause said switch circuit to progressively increase said charging current until said charging current reaches said defined maximum value, thereby maintaining said charging current between said maximum value and said minimum value; and termination logic for terminating said battery charging when said current begins to increase while said control logic is maintaining said selected control signal, as an indication that said battery has reached a fully charged condition.

2. The apparatus of claim 1 further comprising a sensor for measuring the terminal voltage of said battery and for providing a signal representing said battery terminal voltage to said control circuit.

3. The apparatus of claim 2 further comprising control circuit logic for terminating said battery charging responsive to said voltage signal when during said battery charging said voltage begins to decrease, as an indication that said battery is fully charged.

4. The apparatus of claim 2 further comprising control circuit logic for terminating said battery charging responsive to said voltage signal when after said charging current has initially reached said defined maximum value, said battery terminal voltage is lower than a defined threshold value, as an indication that said battery is internally short-circuited.

5. The apparatus of claim 1 further comprising a sensor for measuring the temperature of said battery and for providing a signal representing said battery temperature to said control circuit.

6. The apparatus of claim 5 further comprising control circuit logic for preventing initiation of said battery charging responsive to said battery temperature signal, when said battery temperature is either above or below a defined temperature range.

7. The apparatus of claim 5 further comprising control circuit logic for terminating said charge cycle responsive to said battery temperature signal when said battery temperature exceeds a defined maximum temperature value.

8. Apparatus for controlled battery charging in which a battery is connectable to a power source capable of providing charging current at a suitable terminal voltage, the apparatus comprising:

a switch circuit with a control input for regulating the charging current of said battery, said switch circuit connected in series between said battery and said power source;

a driver circuit for driving said switch circuit control input in response to a pulse width modulated control signal of varying duty ratio applied to said driver circuit;

a circuit connected to said switch circuit for determining said battery charging current and generating a signal proportional thereto;

a control circuit connected to said driver circuit and to said current determining circuit for applying said control signal to said driver circuit, said control circuit comprising logic for varying the duty ratio of said control signal dependent upon said current proportional signal, thereby selecting the value of said charging current applied to said battery by said switching circuit; and said control circuit further comprising logic to progressively increase said control signal duty ratio to progressively increase said battery charging current until said charging current as determined by said current proportional signal reaches a defined maximum value, thereafter said control signal duty ratio being maintained constant until said charging current as determined by said current proportional signal falls below a defined minimum value, whereupon said control signal duty ratio is again progressively increased, thereby continually asserting said charging current at said maximum value and maintaining said charging current between said minimum and maximum values.

9. The apparatus of claim 8 wherein said control circuit logic terminates said charging current when said current proportional signal begins to increase while said control signal duty cycle is maintained constant, as an indication that said battery has reached a fully charged condition.

10. The apparatus of claim 8 further comprising control circuit logic for periodically averaging values of said charging current as determined by said current proportional signal, comparing said average current value with defined minimum and maximum current values and periodically varying the duty ratio of said control signal to maintain said average current value between said minimum and maximum current values until said battery is fully charged.

11. The apparatus of claim 8 further comprising:

a sensor for measuring the terminal voltage of said battery and for providing a signal representing said battery terminal voltage to said control circuit; and control circuit logic for terminating said battery charging responsive to said battery voltage signal when during said charging said battery terminal voltage begins to decrease, as an indication that said battery is fully charged.

12. The apparatus of claim 11 further comprising control circuit logic for terminating said battery charging responsive to said battery voltage signal when after said charging current has initially reached said defined maximum value, said battery terminal voltage is lower than a defined threshold value, as an indication that said battery is internally short-circuited.

13. The apparatus of claim 8 further comprising:

a sensor for measuring the temperature of said battery and for providing a signal representing said battery temperature to said control circuit; and control circuit logic for preventing initiation of said charging cycle responsive to said battery temperature signal, when said battery temperature is outside a defined temperature range.

14. The apparatus of claim 13 further comprising control circuit logic for terminating said battery charging responsive to said battery temperature signal, when said battery temperature exceeds a defined maximum temperature value.

15. A battery-powered electronic device with controlled battery charging, said device including at least one battery connectable to a power source capable of providing charging current at a suitable terminal voltage, the device comprising:

load circuitry connected to said battery;

a switch circuit with a control input for regulating the charging current of said battery, said switch circuit connected in series between said battery and said power source;

a driver circuit for driving said switch circuit control input in response to a pulse width modulated control signal of varying duty ratio applied to said driver circuit;

a circuit connected to said switch circuit for determining said battery charging current and generating a signal proportional thereto;

a control circuit connected to said driver circuit and to said current determining circuit for applying said control signal to said driver circuit;

said control circuit comprising logic for varying or maintaining constant the duty ratio of said control signal dependent upon said current proportional signal, thereby selecting the value of said charging current applied to said battery by said switching circuit; and said control circuit logic terminating said charging current when said current proportional signal begins to increase while said control signal duty cycle is maintained constant, as an indication that said battery has reached a fully charged condition.

16. The device of claim 15 wherein said control circuit logic progressively increases said control signal duty ratio to progressively increase said battery charging current until said charging current as determined by said current proportional signal reaches a defined maximum value, thereafter said control signal duty ratio being maintained constant until said charging current as determined by said current proportional signal, falls below a defined minimum value, whereupon said control signal duty ratio is again progressively increased to maintain said charging current between said minimum and maximum values until said battery is fully charged.

17. The device of claim 15 wherein said switch circuit comprises a series combination of a resistor, an inductor and a FET switching element.

18. The device of claim 17 wherein said determining circuit comprises an amplifier for amplifying the voltage across said resistor due to said charging current.

19. The device of claim 15 further comprising:

a sensor for measuring the terminal voltage of said battery and for providing a signal representing said battery terminal voltage to said control circuit; and control circuit logic for terminating said battery charging responsive to said battery voltage signal when after said charging current has initially reached said defined maximum value, said battery terminal voltage is lower than a defined threshold value, as an indication that said battery is internally short-circuited.

20. The device of claim 15 further comprising:

a sensor for measuring the temperature of said battery and for providing a signal representing said battery temperature to said control circuit; and control circuit logic for preventing said battery charging responsive to said battery temperature signal, when said battery temperature is outside a defined temperature range.

21. A method for controlled battery charging in which a battery is connectable to a power source capable of providing charging current at a suitable terminal voltage, the method comprising:

regulating the charging current of said battery responsive to a variable control signal;

determining said battery charging current and generating a signal proportional thereto;

varying said control signal responsive to said current proportional signal to progressively increase said charging current until said charging current reaches a defined maximum value, maintaining said control signal until said charging current reaches a defined minimum value, varying said control signal to progressively increase said charging current until said charging current reaches said defined maximum value; and terminating said battery charging when said current proportional signal begins to increase while said control signal is being maintained, as an indication that said battery has reached a fully charged condition;

thereby maintaining said charging current between said maximum value and said minimum value until said battery is fully charged.

22. The method of claim 21 further comprising:

measuring the terminal voltage of said battery; and terminating said battery charging responsive to said voltage signal when during said battery charging said voltage begins to decrease, as an indication that said battery is fully charged.

23. The method of claim 22 further comprising terminating said battery charging responsive to said voltage signal when after said charging current has initially reached said defined maximum value, said battery terminal voltage is lower than a defined threshold value, as an indication that said battery is internally short-circuited.

24. The method of claim 21 further comprising:

measuring the temperature of said battery; and preventing initiation of said battery charging responsive to said battery temperature signal, when said battery temperature is either above or below a defined temperature range.

25. The method of claim 24 further comprising terminating said charge cycle responsive to said battery temperature signal when said battery temperature exceeds a defined maximum temperature value.

* * * * *